United States Patent [19]

Wyner

[11] 4,379,205

[45] Apr. 5, 1983

[54] ANALOG SIGNAL SCRAMBLING SYSTEM

[75] Inventor: Aaron D. Wyner, Maplewood, N.J.

[73] Assignee: Bell Telephone Laboratories, Incorporated, Murray Hill, N.J.

[21] Appl. No.: 51,107

[22] Filed: Jun. 22, 1979

[51] Int. Cl.³ .............................................. H04L 9/00

[52] U.S. Cl. ............................... 178/22.10; 179/1.5 R

[58] Field of Search .......................... 179/1.5 R, 1.5 S; 178/22, 22.10; 370/21

[56] References Cited

U.S. PATENT DOCUMENTS

| | | | |
|---|---|---|---|
| 3,959,592 | 5/1976 | Ehrat | 179/1.5 R |
| 4,052,565 | 10/1977 | Baxter et al. | 179/1.5 R |
| 4,100,374 | 7/1978 | Jayant et al. | 179/1.5 R |
| 4,126,761 | 11/1978 | Groupe et al. | 179/1.5 R |
| 4,179,586 | 12/1979 | Mathews, Jr. et al. | 179/1.5 R |
| 4,200,770 | 4/1980 | Hellman et al. | 179/1.5 R |
| 4,227,250 | 10/1980 | Wyner | 370/21 |

OTHER PUBLICATIONS

*Information Theory and Reliable Communication*, Gallager, Wiley and Sons, 1968, pp. 402–404.

"Probate Spheroidal Wave Functions–V", *Bell System Technical Journal*, vol. 57, No. 5, 1978, pp. 1371–1430, D. Slepian.

*The Algebraic Eigenvalve Problem*, Clarendon Press, 1965, Wilkinson.

*An Analog Scrambling Scheme Which does not Expand Bandwidth; I:Discrete Time*, pp. 261, 274, Wegner, IEEE Transactions on Informator Theory, vol. II–25, No. 3, May 1979.

*Primary Examiner*—Sal Cangialosi

*Attorney, Agent, or Firm*—S. J. Phillips; H. R. Popper

[57] ABSTRACT

A speech scrambling system using discrete prolate spheroidal sequence coefficients (PC). The problem is to provide high fidelity and high security in a scrambling system while limiting the bandwidth of the scrambled signal to the bandwidth of the original speech signal. The disclosed system uses PC to solve this problem. The analog speech signal is digitally sampled (100), converted to PC (203, 204, 205), scrambled (208, 209), and converted to scrambled samples (211, 212, 213). The scrambled samples are transmitted using pulse amplitude modulation (102) in the same bandwidth as the original signal. At the receiving end, the inverse steps are performed to recover the original speech. The scrambling is periodically modified (220, 320) to improve security.

8 Claims, 5 Drawing Figures

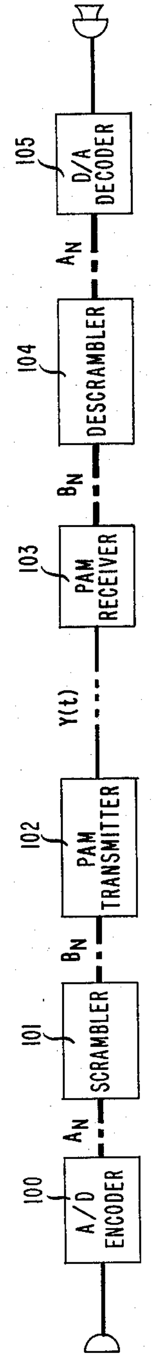
FIG. 1
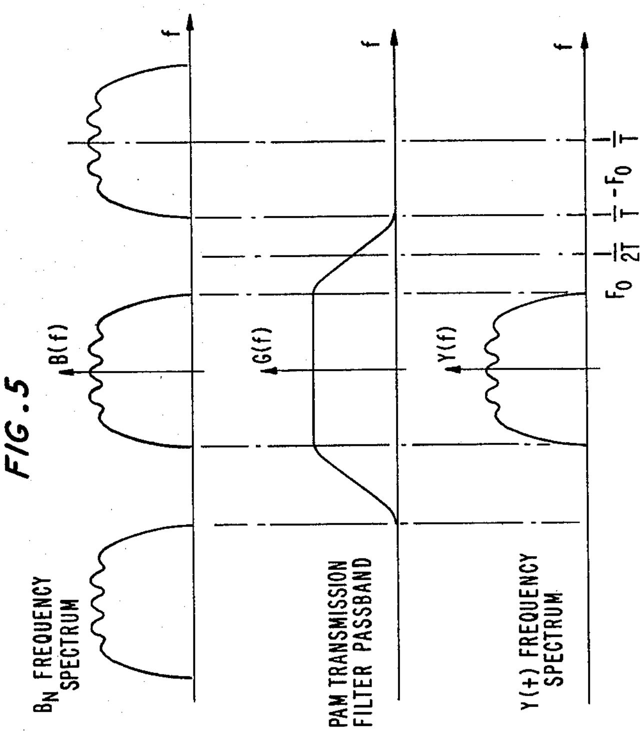
FIG. 5
FIG. 4
H MATRIX MODIFICATION CIRCUIT
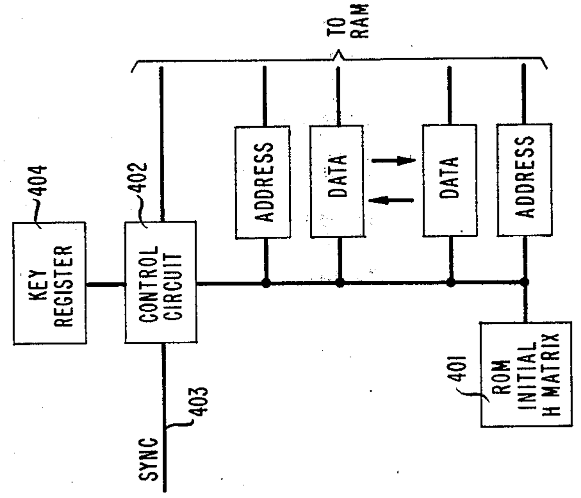

ANALOG SIGNAL SCRAMBLING SYSTEM

TECHNICAL FIELD

This invention relates to systems which scramble analog signals, and more particularly, to speech scrambling systems.

BACKGROUND OF THE INVENTION

In order to provide privacy in a communication system, apparatus is used that renders an analog communication signal unintelligible by altering or "scrambling" the signal in a prearranged way. The intended receiving party uses apparatus to descramble the signal and recover the transmitted information easily while any unintended receiving party experiences considerable difficulty in doing so. Such apparatus finds utility in the field of military, police or other official communications and in the field of civilian communications such as provided by the domestic telephone system. Throughout the following description, the analog communication signal is assumed to be speech, and the communication channel is assumed to be a telephone channel, although it will be understood that wider application of these techniques is envisioned and may include virtually any analog signal and any communication channel having limited bandwidth.

Speech scrambling is provided in the prior art in two basically dissimilar ways, analog scrambling and digital scrambling.

In one type of analog scrambling system, the speech signal is divided into one or more frequency subbands. Signals appearing in these subbands are inverted or the subbands are rearranged or otherwise scrambled in order to produce an unintelligible signal. Analog scrambling has the advantage of inband scrambling. That is, the scrambled signal is limited in bandwidth to the bandwidth of the original signal. Thus a 3.5 KHz telephone speech signal will occupy approximately 3.5 KHz in scrambled form and can be transmitted over ordinary telephone lines without the necessity for additional bandlimiting of the scrambled signal and the resulting unwanted distortion.

The disadvantage of analog scrambling is the limited security offered. Because of the complexity and precision required by the circuitry employed, the speech signal can be conveniently divided into relatively few frequency bands, and these may be interchanged in relatively few ways. A determined interceptor may find it straightforward to descramble the intercepted signal by exhaustively trying all possible combinations of the scrambling variables.

Digital scrambling has the potential for being more secure than analog scramblers. In digital scrambling, the speech signal is first encoded by an analog-to-digital converter into a convenient digital format. In one such format, eight-bit binary numbers are used to represent the speech waveform amplitude at repeated sample intervals. The binary digits of the sampled waveform are then subjected to digital scrambling. Existing techniques for digital encryption may be used to obtain virtually any desired degree of security.

The disadvantage of digital scrambling in a practical transmission system such as a telephone system is a substantial increase in bandwidth. A sampling rate of 8000 samples per second is suitable for a 3.5 KHz speech signal. With eight-bit samples, this results in a potential scrambled signal bit rate of 64 Kbps. For transmission over a telephone channel this will require a bandwidth considerably in excess of 3.5 KHz. Alternatively, techniques may be employed to reduce required bandwidth to 3.5 KHz, but these techniques introduce unwanted distortion and result in a loss of fidelity.

It has, therefore, been a problem in the prior art to provide a scrambling system that has the advantage of the high security afforded by digital scrambling without expanding bandwidth of the scrambled signal and thus either requiring a broadband communication channel or inducing distortion and loss of fidelity. Restated, the problem is to provide a secure inband digital speech scrambling system.

DESCRIPTION OF THE PRIOR ART

U.S. Pat. No. 4,086,435, issued to Graupe, et al, Apr. 25, 1978, described a digital scrambling system in which eight-bit signal samples are scrambled by interchanging the bits appearing at particular fixed positions in the eight-bit digital word. This system has the disadvantage of expanding bandwidth in the manner described above.

U.S. Pat. No. 4,100,374 issued to Jayant, et al, July 11, 1978 describes a scrambling system wherein speech samples are divided into groups of N successive samples. Each sample group is uniformly permuted by transposing samples. This system also expands bandwidth of the scrambled signal.

U.S. Pat. No. 4,052,565 issued to Baxter, et al Oct. 4, 1977 discloses a system that multiplies the sampled speech signal with a periodically cycling set of Walsh functions. According to the Baxter, et al disclosure this results in inband scrambling. However, rapidly changing Walsh functions are needed to give the greatest degree of security. This requires bandlimiting and a resulting loss of fidelity. The Baxter, et al system does not have the combination of security and fidelity offered by the present invention.

SUMMARY OF THE INVENTION

The present invention provides a digital scrambling system for an analog signal such as speech, that performs inband scrambling in a secure way. This is done by first digitally sampling the analog signal, then transforming the digital samples into an intermediate digital form that can be scrambled in an advantageous manner. The intermediate digital form chosen for the present invention is a series of digital numbers known as discrete prolate spheroidal sequence coefficients or, more briefly, prolate coefficients (PC).

The PC of the original signal are scrambled by a particular digital process that results in new PC of a new scrambled analog signal with substantially the same bandwidth as the original signal.

Digital samples of the scrambled analog signal, analogous in form to the digital samples of the original analog signal, are transmitted to the receiving end. These scrambled digital samples are obtained directly from the scrambled PC and are transmitted using pulse amplitude modulation (PAM). The PAM signal has no greater bandwidth than the scrambled analog signal, so that bandwidth is again preserved. By transmitting in PAM digital form, it can be assured that the receiving end will obtain an accurate reproduction of the binary digits of the scrambled digital signal, and that descrambling will proceed correctly.

At the receiving end, binary digits of the scrambled digital signal are converted into scrambled PC form.

The scrambled PC are converted to descrambled PC, the descrambled PC are converted into digital sampled form, and the digital samples are converted to analog form.

To aid in understanding, the scrambling technique employed in the present invention may be thought of as PC domain scrambling. In the prior art, an analog signal is transformed into the frequency domain and its frequency components are scrambled to form the frequency components of a new scrambled analog signal. In the present invention an analog signal is transformed into the PC domain and the PC are scrambled to form the PC of a new scrambled analog signal.

The individual steps performed by the apparatus of the present invention in converting digital speech samples to PC, scrambling the PC and so on, are each carried out by a process which can be described mathematically as matrix multiplication using a constant matrix multiplier. By design, each of the steps employed is easily reversible, and descrambling can be performed by apparatus that is substantially similar to that used for scrambling.

Digital samples are converted to PC by multiplication with a matrix quantity designated in the description below as the Q matrix. This process is used in the scrambler to convert original digital samples into PC form and in the descrambler to convert scrambled digital samples into scrambled PC form. PC are converted to digital samples by multiplication with a matrix $Q^T$ the transpose of the matrix Q, that is a matrix having the same values but with its rows and columns interchanged. This process is used in the scrambler to convert scrambled PC into scrambled digital samples and in the descrambler to convert PC back into the original digital samples.

PC are scrambled by multiplication with a matrix H and descrambled by multiplication with a matrix $H^T$ its transpose. Matrices H and $H^T$ can be any of the class of matrices whose transpose is proportional to its inverse. A special group of such matrices is used in the particular embodiment described below, the Hadamard matrices whose values are restricted to +1 and −1. A Hadamard matrix is particularly useful because its form can be permuted easily into another Hadamard matrix with elementary steps. Any two columns or any two rows may be interchanged, and any row or column may be multiplied by −1 without changing the essential properties of the Hadamard matrix that make it useful for scrambling in the present invention. This property of Hadamard matrices is exploited in the particular embodiment to increase security. As the scrambling system is being used, the H and $H^T$ matrices are routinely modified to make unauthorized descrambling more difficult.

BRIEF DESCRIPTION OF THE DRAWING

FIG. 1 shows a speech scrambling system constructed according to the present invention.

FIG. 4 details the apparatus 220 and 320 of FIGS. 2 and 3 which modify the scrambling matrix to increase security.

FIG. 5 shows the characteristic curve of the transmission filter used in the pulse amplitude modulation transmitter of FIG. 1.

DETAILED DESCRIPTION OF THE DRAWING

FIG. 1 shows a secure communication system for conveying scrambled speech according to the present invention. Encoder 100 performs an analog-to-digital conversion on speech input, converting the analog signal to twelve-bit digital samples A. For a voice signal channel of 3.5 KHz bandwidth a sampling rate of 8000 samples per second will satisfy the Nyquist sampling criteria. Sequential speech samples are arbitrarily divided into blocks of N samples $A_N$, where N is a fixed number selected for convenience in the processing steps which follow. N may be on the order of 50 to 100 or more. The samples $A_N$ may be thought of as a one dimensional matrix of numbers upon which matrix operations are to be performed.

Figure 2:
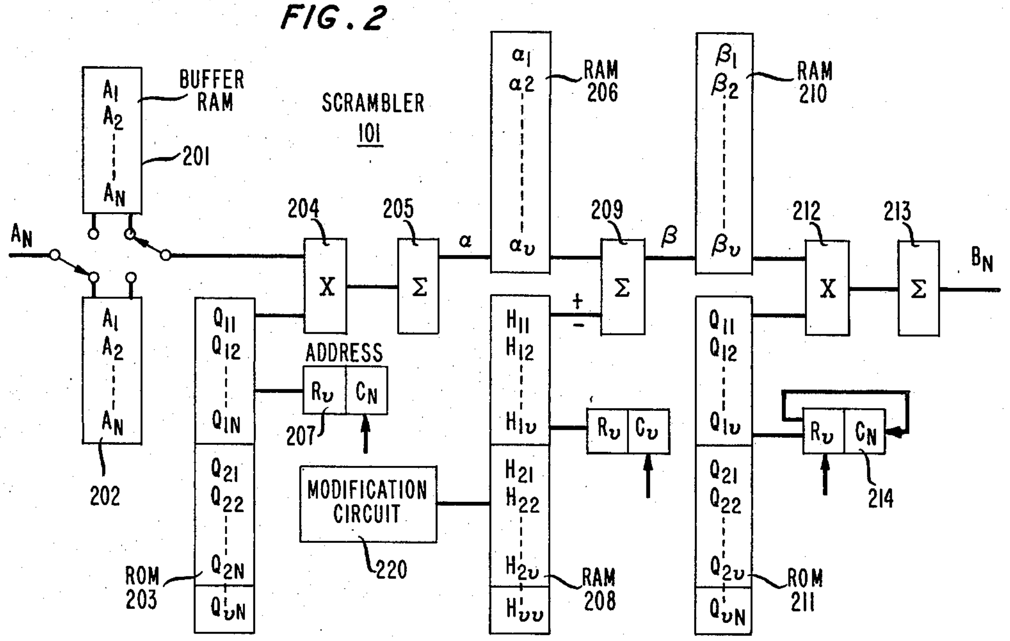
FIG. 2 details the scrambler 101 portion of the system shown in FIG. 1.

Scrambler 101, described in more detail with respect to FIG. 2, performs a series of matrix multiplications upon the block of N speech samples $A_N$ to form a block of N scrambled twelve-bit digital signal samples $B_N$. These twelve-bit quantities are transmitted by pulse amplitude modulation (PAM) transmitter 102 to receiver 103. The PAM waveform Y(t) has a spectrum like that shown in the bottom curve of FIG. 5, having no frequency components outside $F_O$, the 3.5 KHz bandwidth of the original analog speech signal. PAM receiver 103 samples Y(t) in synchronism with transmitter 102 and recovers the block of N twelve-bit binary samples $B_N$. Descrambler 104, described more fully with respect to FIG. 3, performs a series of matrix multiplication steps upon the twelve-bit scrambled digital samples $B_N$ which results in the block of N twelve-bit digital signal samples $A_N$ of the original speech waveform. Samples $A_N$ are applied to decoder 105 to convert the digital samples into a speech waveform that is a close analog replica of the input.

FIG. 2 shows details of scrambler 101 of the speech scrambler system of FIG. 1. A block of sequential digital speech samples $A_N$ is temporarily stored either in random access memory 201 or 202. Since the matrix multiplication operations to be performed by the scrambler require a full complement of N samples, memories 201 and 202 are filled alternately. The N samples from memory 201 are processed while the next N samples are filling memory 202, and vice versa.

Read only memory 203 retains a collection of numbers, the Q matrix used to convert the signal samples $A_N$ by matrix multiplication to a series of discrete prolate spheroidal sequence coefficients (PC) $\alpha$ of the signal samples in conjunction with multiplier 204 and accumulator register 205. Read only memory 203 contains blocks of numbers Q, each block being N in length. There are a total of $\nu$ of these blocks, for a total number of stored values equal to $\nu$ multiplied by N. The value of $\nu$ is chosen to be approximately equal to N times the Nyquist sampling rate for the highest frequency present in the original analog signal divided by the actual sampling rate used in the communication system. The values stored in read only memory comprise a two dimensional matrix of values stored row by row, there being $\nu$ rows and N columns thus forming a matrix Q of $\nu \times N$ values.

The values of the Q matrix, $Q_{11}$, $Q_{12}$ etc. are obtained by solving a set of simultaneous equations of the form $$\lambda Q_n = \sum_{m=1}^{N} \gamma(n-m)Q_m \qquad (1)$$

where n is an integer that ranges from 1 to N, the number of samples to be processed in a single block. The function $\gamma(x)$ is defined as $$\gamma(x) = \frac{\sin 2\pi Wx}{\pi x}, \; x \neq 0 \qquad (2)$$

$$\gamma(x) = 2W, \; x = 0$$

where the value of W is obtained from the design parameters of the communication system. W is equal to one-half the Nyquist sampling rate for the highest frequency present in the original analog signal divided by the actual sampling rate used in the communication system. Equation (1) expands to N equations in N unknowns with an unknown quantity $\lambda$ called an eigenvalue. The problem of solving these N equations for the eigenvalues and $N \times N$ values of Q is known in the literature as the matrix eigenvalue problem. There are known techniques for solving this problem, as well as computer programs available commercially for numerical computation. There are exactly N distinct values of $\lambda$ for which solutions exist, $\lambda_1, \lambda_2, \ldots, \lambda_N$, where the $\lambda$'s are ordered according to size so that $\lambda_1 > \lambda_2 > \ldots > \lambda_N$. The N values $Q_{11}, Q_{12}, \ldots, Q_{1N}$ give the solution $\lambda_1$; $Q_{21}, Q_{22}, \ldots, Q_{2N}$ give the solution $\lambda_2$ and so forth. The quantities stored in read only memory 208 are the Q's corresponding to $\lambda_1, \lambda_2, \ldots, \lambda_\nu$, the $\nu$ largest eigenvalues. See for example, J. H. Wilkinson, *The Algebraic Eigenvalue Problem,* Clarendon Press, 1965. Computer programs will be found in C. Reinsch et al, *Linear Algebra,* Springer, 1971 and may also be found in subroutine libraries supplied with scientific computing equipment. As for the application of discrete prolate spheroidal sequences to communications problems, see D. Slepian, "Prolate Spheroidal Wave Functions-V", *Bell System Technical Journal,* Vol. 57 No. 5, May-June, 1978 and my paper "An Analog Scrambling Scheme Which Does Not Expand Bandwidth, Part 1: Discrete Time" *IEEE Transaction On Information Theory,* Vol. I-T-25, No. 3 May 1979. This last reference gives the mathematical background for the techniques used in the present invention.

The PC representation $\alpha$ of the signal samples $A_N$ is obtained by performing the matrix multiplication of the contents of read only memory 203 with the signal samples $A_N$ stored in random access memory 201 or 202. The product of $A_1$ and $Q_{11}$ is formed by multiplier 204 and stored in accumulator register 205. The product of $A_2$ and $Q_{12}$ is next formed and summed in accumulator register 205. This proceeds until all N values of A and the first N values of Q ($Q_{11}, Q_{12}, \ldots, Q_{1N}$) are multiplied and accumulated resulting in the first $\alpha$ value $\alpha_1$ stored in random access memory 206. Next the products of $A_N$ and $Q_{21}, Q_{22}, \ldots, Q_{2N}$ are formed and accumulated to produce $\alpha_2$ in random access memory 206.

Proceeding in this way, matrix multiplication is performed between the N values of A, which may be thought of as a matrix with one row and N columns, with the Q matrix with $\nu$ rows and N columns to form the $\nu$ values of $\alpha$ for storage in random access memory 206.

The low order bits of address counter 207 comprise an N-state column counter field $C_N$ and the high order bits comprise an $\nu$-state row counter field $R_\nu$. Information is read in normal order, first by column, then by row, by incrementing the low order bit of $C_N$ and carrying overflow from the column counter field to the row counter field.

By way of contrast, it may be noted that the arrangement of address register 214 is different. Because it is desired at multiplier 212 to multiply by matrix $Q^T$, the transpose of the Q matrix values that are stored in read only memory 211, information is read in transpose order first by row, then by column. The low order bit of the row counter field $R_\nu$ is incremented, and overflow is carried to the column counter field $C_N$. This arrangement effectively interchanges the rows and column of Q to form $Q^T$, but permits the same read only memory information to be used in memories 203 and 211.

The PC stored in random access memory 206 of FIG. 2 are scrambled using the H scrambling matrix information stored in random access memory 208 in conjunction with accumulator register 209 to form a series of scrambled PC representations $\beta$. Memory 208 may contain any $\nu$ by $\nu$ matrix whose transpose is proportional to its inverse, however a Hadamard matrix is preferred when the optional modification circuit 220 is employed. A Hadamard matrix is a matrix with the number of columns equal to the number of rows, each number in the matrix having the value of $+1$ or $-1$. The transpose of a Hadamard matrix is proportional to its inverse. An example of a $2 \times 2$ Hadamard matrix is the array $$\begin{matrix} 1 & 1 \\ 1 & -1 \end{matrix}$$

Hadamard matrices with various numbers of elements can be constructed easily with known techniques. See, for example, W. W. Peterson et al, *Error-Correcting Codes,* second edition, MIT Press, 1972, pp. 129 et seq. and references cited therein. Values stored in memory 208 form a $\nu$ by $\nu$ Hadamard matrix stored first by column, then by row. Each stored value is represented by a single bit of information, each a one or a zero respectively representing $+1$ or $-1$. Matrix multiplication then effectively takes place by adding or subtracting each value stored in random access memory 206 according to the value of the corresponding binary digit stored in random access memory 208. Each number $\alpha_1$ through $\alpha_\nu$ is selectively added or subtracted into accumulator register 209 depending upon the value of binary digit $H_{11}$ through $H_{1\nu}$. This forms the value of $\beta_1$ which is then stored in random access memory 210, and the process proceeds in this manner to form the $\nu$ values of $\beta$. An additional multiplier would be employed in an embodiment where matrix H contains values other than $+1$ and $-1$.

The scrambled PC representation $\beta$ stored in random access memory 210 is next converted to scrambled digital samples $B_N$ by matrix multiplication with the $Q^T$ matrix values stored in read only memory 211 in conjunction with multiplier 212 and accumulator register 213 in a manner similar to that described for the Q matrix above. As previously described, values of Q are read from memory 214 in transposed order to effectively obtain $Q^T$.

Figure 3:
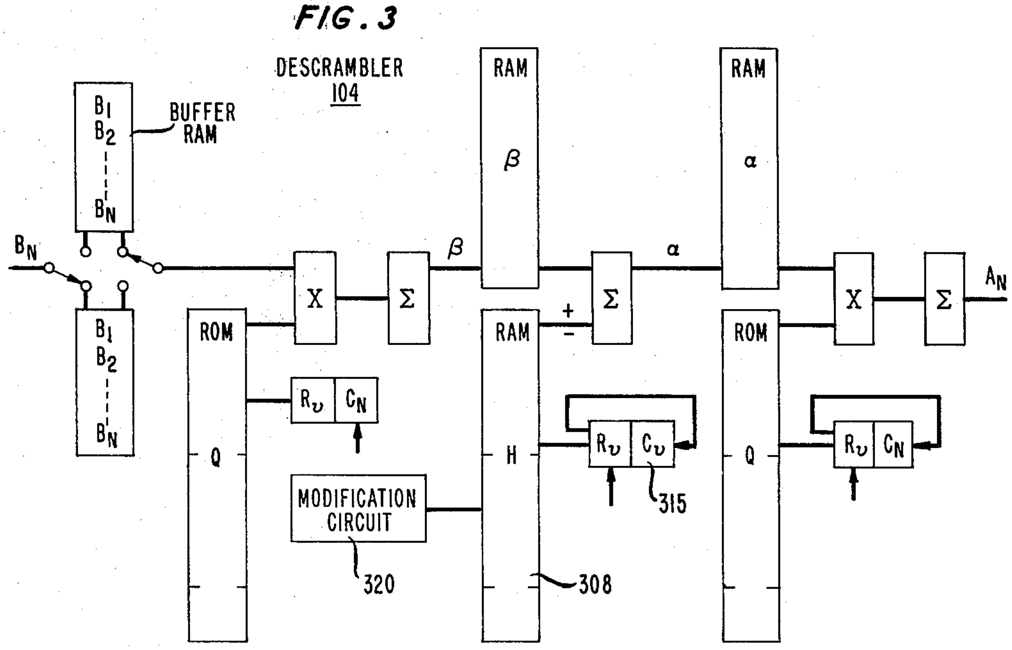
FIG. 3 details the descrambler 104 portion of the system shown in FIG. 1.

For increased security, the scrambling matrix H stored in random access memory 208 may be modified periodically by the optional modification circuitry shown at 220 in synchronism with similar modification circuitry operating in the descrambler of FIG. 3. Details of the modification circuitry is found with respect to the description of FIG. 4.

FIG. 3 shows details of descrambler 104 of the speech scrambler system of FIG. 1. The operation of descrambler 104 is analogous to the operation of scrambler 101. Blocks of scrambled digital signal samples $B_N$ are alternately stored in random access memory. Matrix multiplication is performed on the samples $B_N$ with matrix Q to form the scrambled PC representations $\beta$.

Matrix multiplication is performed with the stored values of $\beta$ with the descrambling matrix $H^T$ to form the descrambled PC representation $\alpha$. The values for matrix H are stored in random access memory 308 and are read out in transposed order by incrementing the row counter field of address register 315 in the manner previously described with respect to address register 214. The descrambled PC are multiplied by matrix $Q^T$ to produce the digital signal samples $A_N$.

FIG. 4 shows details of one embodiment of a suitable H matrix modification circuit 220 of FIG. 2 and 320 of FIG. 3 used to modify the scrambling matrix H and the descrambling matrix $H^T$ to increase security of the scrambling system. The two circuits operate in synchronism to perform the same modification to the contents of their respective random access memories.

Random access memory 208 or 308 is initialized by the modification circuit to contain the contents of read only memory 401. Control circuit 402 writes the contents of memory 401 into random access memory through appropriate data and address registers. After initialization, the contents of random access memory is altered periodically and synchronously in the scrambler and descrambler to modify the H and $H^T$ matrices. Control circuit 402 reads data from the random access memory and modifies it in one or more specific ways. All the binary digits in any column of the stored H matrix may be complemented. This effectively changes each +1 to −1 and vice versa, thus changing the sign of the entire column of data. Similarly, the sign of each entry in any row may be changed. Further, the values in any two rows may be interchanged or the values in any two columns may be interchanged. To this end two data registers are used in conjunction with two address registers to perform the interchange.

Synchronism between circuits 220 and 320 is maintained by communicating control signals over signal path 403. Clocking or other appropriate control signals may pass between the respective circuits and the PAM transmitter and receiver, for example, or directly between the circuits themselves using a suitable communication channel.

In order to specify the precise H matrix modifications to take place in the system, key register 404 contains control data which specifies the modifications to be made and the order in which they are to be performed. The same key information is applied to the scrambler and to the descrambler.

FIG. 5 shows the frequency spectrum of the scrambled digital samples $B_N$. Advantageously, the principal bandwidth of the $B_N$ samples is limited to frequency $F_O$ where $F_O$ is equal to the highest frequency component present in the original analog signal, here approximately 3.5 KHz. Due to the properties of the PC employed in the present invention, there are negligible frequency components present between repeating bands of the $B_N$ spectrum. For this reason, the requirements for the PAM transmission filter characteristic G(f) may be somewhat relaxed and need not cut off as sharply as with other systems using PAM. Components of $B_N$ do not appear again until frequency $1/T-Fo$ where $1/T$ is the sampling rate. The pass bandwidth of G(f) then need not become zero until the value $1/T-Fo$. The spectrum of the resulting PAM signal Y(t) is shown at the bottom of FIG. 5.

I claim:

1. Scrambling apparatus for converting digital samples of an analog signal having a prescribed bandwidth into a scrambled analog signal for application to a channel having a bandwidth no greater than that needed for the original signal, comprising:
   means for forming a first vector $\alpha$ of discrete prolate spheroidal sequence coefficient signals from said digital samples of said analog signal,
   means responsive to said signals formed by said first means for rearranging said first vector of signals into a scrambled vector $\beta$ of discrete prolate spheroidal sequence coefficient signals,
   means responsive to said output rearranging means for reforming said scrambled vector of discrete prolate spheroidal sequence coefficient signals to output scrambled digital signal samples ($B_n$) for transmission, and
   means for applying said output scrambled digital signal samples as an analog signal to said channel.

2. Apparatus of claim 1 wherein said means for forming said first vector of coefficient signals from said digital samples, comprises:
   means for storing a "Q" matrix of signals, and
   means for multiplying said digital samples of said analog signal with the contents of said "Q" matrix storing means, said "Q" matrix having columns which are eigenvectors corresponding to the approximately nonzero eigenvalues of a matrix, any element (m, n) of which satisfies the relationship $$\frac{\sin 2\pi W(n-m)}{\pi(n-m)}$$

for $n \neq m$, where W is the quotient formed by dividing the highest frequency present in the original analog signal by the rate at which the analog signal is sampled.

3. Apparatus of claim 1 wherein said means for rearranging said first vector of signals into said scrambled vector of signals ($\beta$) comprises
   means for storing a Hadamard matrix of signals, accumulator register means, and means coupling said first matrix of signals and
   said Hadamard matrix storing means to said accumulator register means.

4. Apparatus of claim 3, further comprising means coupled to said Hadamard matrix storing means for periodically modifying said Hadamard matrix.

5. Apparatus of claim 2 wherein said means for reforming said scrambled matrix of coefficient signals, comprises:
   means for storing an inverse "Q" matrix of signals, and
   means for multiplying said scrambled matrix of coefficient signals by the contents of said inverse "Q" matrix storing means.

6. Descrambling apparatus for converting digital samples of a scrambled analog signal received over a channel into a descrambled analog signal comprising:
   means for forming a preliminary vector ($\beta$) of scrambled discrete prolate spheroidal sequence coefficient signals from said digital samples of said scrambled analog signal, means for rearranging said preliminary vector of signals into a further vector $\alpha$ of descrambled discrete prolate spheroidal sequence coefficient signals, means for reforming said further vector of descrambled coefficient signals to output descrambled digital signal samples ($A_n$), and means for converting said descrambled samples to an analog signal.

7. Signal scrambling the method for converting digital samples of an analog signal having a prescribed bandwidth into a scrambled signal capable of being transmitted without substantial distortion over a channel having a bandwidth no greater than that of the original signal, comprising the steps of:

forming a first vector $\alpha$ of discrete prolate spheroidal sequence coefficient signals from said digital samples of said analog signal, rearranging said first vector of signals into a scrambled vector $\beta$ of discrete prolate spheroidal sequence coefficient signals, reforming said scrambled vector of discrete prolate spheroidal sequence coefficient signals to output scrambled digital signal samples ($B_n$) for transmission, and applying said scrambled digital signal samples as an analog signal to said channel.

8. Signal descrambling method of converting digital samples of a scrambled analog signal into a descrambled analog signal comprising:

forming a preliminary vector ($\beta$) of scrambled discrete prolate spheroidal sequence coefficient signals from said digital samples of said scrambled analog signal, rearranging said preliminary vector of signals into a further vector $\alpha$ of descrambled discrete prolate spheroidal sequence coefficient signals, reforming said further vector of descrambled coefficient signals to output descrambled digital signal samples ($A_n$), and converting said descrambled samples to an analog signal.

* * * * *